United States Patent
Heeter et al.

(10) Patent No.: US 7,969,706 B2
(45) Date of Patent: Jun. 28, 2011

(54) LIGHTNING PROTECTION SYSTEM FOR AIRCRAFT COMPOSITE STRUCTURE

(75) Inventors: Russell J. Heeter, Sammamish, WA (US); Jeffrey D. Morgan, Kent, WA (US); Kevin D. Pate, Kirkland, WA (US); John R. Porter, Lynnwood, WA (US); Darrin M. Hansen, Seattle, WA (US); Steven C. Steckmyer, Issaquah, WA (US); Thu A. Nguyen, Mukilteo, WA (US); Dale B. Winter, Maple Valley, WA (US); Daniel Smith, Issaquah, WA (US); Harry E. Townsend, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/573,277

(22) Filed: Oct. 5, 2009

(65) Prior Publication Data
US 2010/0020461 A1 Jan. 28, 2010

Related U.S. Application Data

(63) Continuation of application No. 11/608,050, filed on Dec. 7, 2006, now Pat. No. 7,599,164.

(51) Int. Cl.
*H02H 1/00* (2006.01)
(52) U.S. Cl. .................................. 361/218; 361/117
(58) Field of Classification Search .......... 361/117–119, 361/218
See application file for complete search history.

(56) References Cited

U.S. PATENT DOCUMENTS

| | | | |
|---|---|---|---|
| 3,892,099 A | 7/1975 | Worgan et al. | |
| 4,417,463 A * | 11/1983 | Nelson | 72/430 |
| 4,502,092 A | 2/1985 | Bannink et al. | |
| 4,628,402 A | 12/1986 | Covey | |
| 4,630,168 A | 12/1986 | Hunt | |
| 4,681,497 A | 7/1987 | Berecz | |
| 4,755,904 A | 7/1988 | Brick | |
| 5,845,872 A | 12/1998 | Pridham et al. | |
| 7,050,286 B2 | 5/2006 | Pridham et al. | |
| 7,307,825 B2 | 12/2007 | De La Fuente De Ana et al. | |

FOREIGN PATENT DOCUMENTS
WO 8401487 4/1984

OTHER PUBLICATIONS

USPTO Final office action for U.S. Appl. No. 12/171,979 (06-0180A) dated Sep. 9, 2010.

* cited by examiner

*Primary Examiner* — Danny Nguyen
(74) *Attorney, Agent, or Firm* — Yee & Associates, P.C.

(57) ABSTRACT

A lightning-protected conductive composite fuel tank includes a conductive material arrayed on an outer surface to at least partially cover a fastener centerline. Through holes extend along the fastener centerline through the conductive material and the underlying fuel tank shell. These through holes are countersunk into the fuel tank shell to a depth such that a fastener in a through hole will avoid electrical continuity or communication with the conductive material on the fuel tank outer surface. The gap in the countersunk through holes, between the fastener heads and the coextensive outer surface of the fuel tank, is filled with a dielectric or nonconductive material.

20 Claims, 3 Drawing Sheets

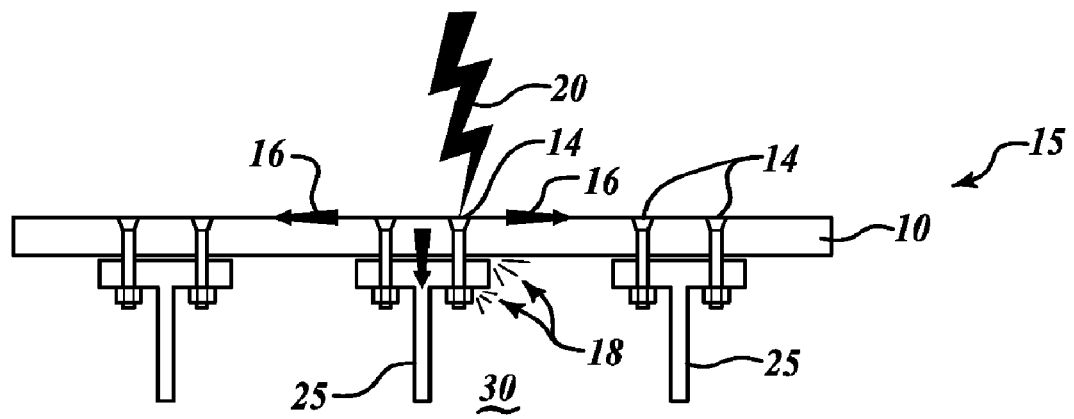
FIG.1 *(PRIOR ART)*
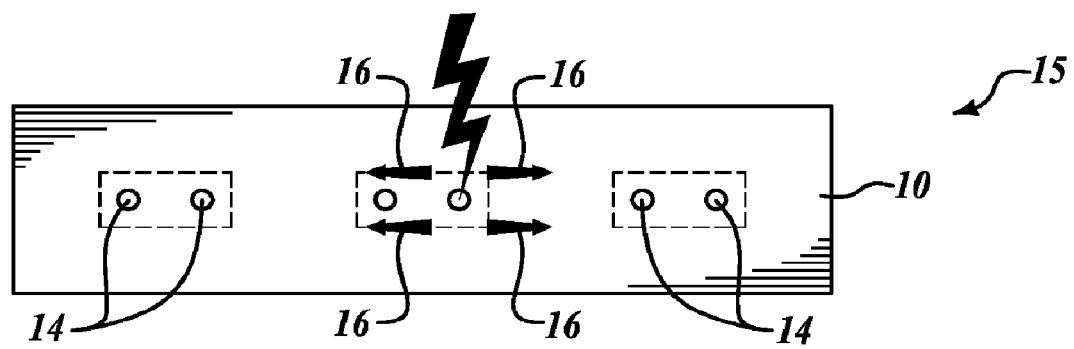
FIG.2 *(PRIOR ART)*

LIGHTNING PROTECTION SYSTEM FOR AIRCRAFT COMPOSITE STRUCTURE

This application is a continuation of application Ser. No. 11/608,050, filed Dec. 7, 2006, status allowed.

TECHNICAL FIELD

The embodiments described herein generally relate to fasteners used in aerospace applications, and more particularly relates to fasteners that provide lightning protection when used to fasten composite or non electrically conducting materials.

BACKGROUND

Use of composites such as carbon fiber reinforced plastics is becoming more common as advancements in composite technologies increase. Use of composites allows designers to improve structural performance compared to metal structure and reduce weight. A major challenge to the use of composite structure is its susceptibility to the effects of lightning compared to metal.

Metal structure such as aluminum fuel tanks provide a layer of inherent lightning protection given its high conductivity material property and low resistance between structural components fastened together with metal fasteners. The high conductive properties of aluminum allow lightning currents to conduct through structure with no adverse effects including rupture of aluminum skins or ignition sources within the fuel tank. Lightning protection for metal is typically achieved by ample skin thickness and fastening joints together using methods that will prevent ignitions.

Lightning protection of composite structure, such as carbon fiber reinforced plastic, is more complicated due to its higher electrical resistance and multi-layer construction. When lightning attaches to composite surfaces the lightning currents tend to be high at the surface penetrating metal fasteners attached to underlying substructure. These currents may create ignition sources inside a composite structure like a fuel tank. (In some cases where the substructure is metal and the skins are composite a substantial amount of lightning current will flow into substructure such as a rib of a fuel tank. This typically results in arcing and sparking between the fastener and the structural elements causing the projection of incendiary particles and gases into the fueled volume.). These underlying components include, for example, fuel tanks, which may be metallic or of a conductive composite material, such as for example, carbon fiber reinforced plastic ("CFRP"). While metallic tanks conduct current away, to the aircraft substructure, lightning poses a potential hazard when the fuel tank is made of a conductive composite material. Generally, upper surfaces of metallic fasteners, that secure the tank and that penetrate into the fuel tank, are exposed to direct lightning attachment. As a result, there is a susceptibility to sparking/arcing inside the conductive composite fuel tank from these fasteners as very high lightning currents enter the skin and substructure components of the fuel tank via the fasteners. Under certain conditions, this could result in ignition within the fuel tank.

FIGS. 1 and 2 depict the potential effects of lightning attachment 20 directly to the head of a fastener 14 used to attach a CFRP fuel tank skin 10 to metal substructure 25 of the fuel tank 15 (a portion of the tank is depicted). The conductivity of the metal substructure 25, and its multiple attachment points to aircraft structure (not shown), create favorable conditions for potentially drawing lightning currents into the fuel tank volume 30. As shown by arrows 16, energy flows along the outer surface of the skin 10 and through the skin 10. These energy flows are sufficiently high to generate "hot particles" 18 that may eject from the fasteners 14 into the fuel tank interior 30 thereby creating a hazard.

To avoid the potential for ignition sources, some fuel tanks have fastener assemblies that are capable of carrying large lightning currents without generating hot particles or sparking. Other fuel tank attachments avoid direct attachment of the fuel tank to the aircraft substructure and utilize patches over the fasteners of the tank skin, to shield the tank from lightning attachment. However, these methods present manufacturing challenges that make utilization difficult, expensive and prone to failure.

Accordingly, it is desirable to shield or otherwise protect a fuel tank with a conductive composite skin from current and voltage surges from a lightning strike. The fuel tank protection should avoid the formation of hot particles that eject into the fuel tank volume, or arcing into the tank. In addition, the protective technology should be relatively straightforward to implement in routine manufacturing processes. Furthermore, other desirable features and characteristics of the technology for lightning protection for fuel tanks will become apparent from the subsequent detailed description and the appended claims, taken in conjunction with the accompanying drawings and the foregoing technical field and background.

SUMMARY

In an embodiment, a lightning-protected conductive composite fuel tank includes a semi- or non-electrically conductive fuel tank shell with an internal volume configured to contain fuel. A conductive material is arrayed on an outer surface of the conductive fuel tank to at least partially cover a fastener centerline. Through holes extend along the fastener centerline through the conductive material and the underlying fuel tank shell. These through holes are configured to receive fasteners securing the fuel tank shell to aircraft substructure. The through holes are countersunk into the fuel tank shell to a depth such that a fastener in a through hole will avoid electrical continuity with the conductive material on the fuel tank outer surface. The gap in the countersunk through holes, between the fastener heads and the coextensive outer surface of the fuel tank, is filled with a dielectric or nonconductive material.

In another exemplary embodiment there is provided a method of fabricating a lightning protected aircraft fuel tank. The method includes the steps of selecting a fuel tank that has a shell made of conductive composite material and locations for fasteners along fastener centerlines. The conductive material is at an outer surface of the shell along the locations for fastener centerlines. The method further includes creating holes countersunk to receive fastener heads in the shell at fastener points in the fastener centerlines, and attaching the fuel tank to aircraft substructure with fasteners in the countersunk holes so that fastener head portions are not in electrical contact with the conductive material. In addition the method includes filling spaces between the fastener head portions and the outer surface of the shell with a nonconductive or dielectric material.

BRIEF DESCRIPTION OF THE DRAWINGS

Various embodiments will hereinafter be described in conjunction with the following drawing figures, wherein like numerals denote like elements, and FIG. 1 is a schematic partial cross section view of a prior art portion of a fuel tank showing tank skin fastened to tank substructure with fastener heads exposed to lightning strikes;

FIG. 2 is a top view of the prior art fuel tank portion of FIG. 1;

DETAILED DESCRIPTION

Figure 3:
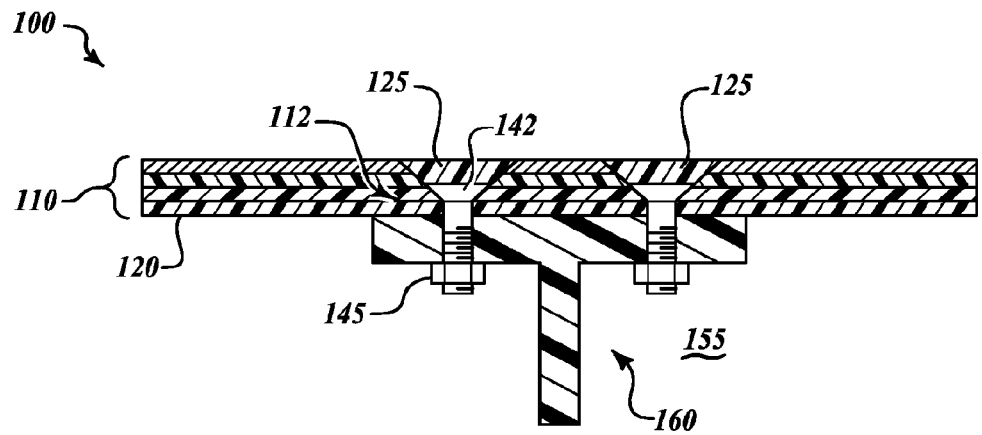
FIG. 3 is a schematic cross sectional view of a portion of a fuel tank in accordance with an exemplary embodiment.

The following detailed description is merely exemplary in nature and is not intended to limit the described embodiments or the application and uses of the described embodiments. Furthermore, there is no intention to be bound by any expressed or implied theory presented in the preceding technical field, background, brief summary or the following detailed description.

In accordance with an exemplary embodiment, a conductive composite fuel tank has a conductive layer or strip extending on its outer surface, exposed to the lightning-producing environment. The conductive layer may be embedded in the outer surface of the conductive tank skin during tank fabrication of a composite tank. For example, the conductive layer may be effectively adhered to the skin during a tank skin cure process. Alternatively, the conductive strip may be bonded to the tank skin with an adhesive suitable for use in aerospace applications. In either event, the conductive layer must be tightly adherent to avoid separation of the layer from the tank skin during ordinary conditions of use. The conditions may include, for example, differential expansion between tank skin and conductive layer because of different coefficients of thermal conductivity of the materials. In addition, some flexing of wing mounted tanks is to be expected, and the flexing should not cause separation of the conductive layer from the tank outer surface.

In an embodiment, the conductive layer covers areas of the tank skin through which fasteners will extend to mount the tank to its substructure of the aircraft. Since these fasteners ordinarily occur along a predetermined fastener centerline, an embodiment of the conductive layer includes a strip of conductive material that covers at least the fastener centerline. The conductive layer should be sufficiently wide and/or thick that it is able to dissipate the energy of a lightning strike by permitting current to flow through itself to aircraft structure for transmission to a grounding system. The dimensions of the conductive layer will consequently vary according the material used, and other factors, such as manufacturing ease, etc. In one embodiment, the strips are metallic. Strips of expanded aluminum foil are useful as lightweight conductors, for example, but other suitable metallic strips may also be used. For example, mesh metallic strips also provide a lightweight good conductor.

According to an embodiment, fasteners that attach the fuel tank skin to substructure extend through holes in the skin. These holes are countersunk on the tank skin outer surface so that fastener heads are below the outer surface of the skin and not in contact with the conductive layer on the outer surface of the fuel tank skin. The sunken heads of the fasteners are covered with a dielectric or nonconductive material plug. Accordingly, electrical communication or continuity from the plug or surrounding conductive strip is minimal, if any. As a consequence, lightning attachment results in energy dissipation along the conductive layer and not to the tank interior via the length of the fasteners, from fastener head to fastener terminal end. The dielectric or nonconductive plugs must be tightly adherent and resist separation from the countersunk through hole regions during ordinary conditions of use. The conditions may include, for example, differential expansion between tank skin and plug material because of different coefficients of thermal conductivity of the materials. In addition, some flexing of wing mounted tanks is to be expected, and the flexing should not cause separation of the plugs from the countersunk through holes.

Figure 4:
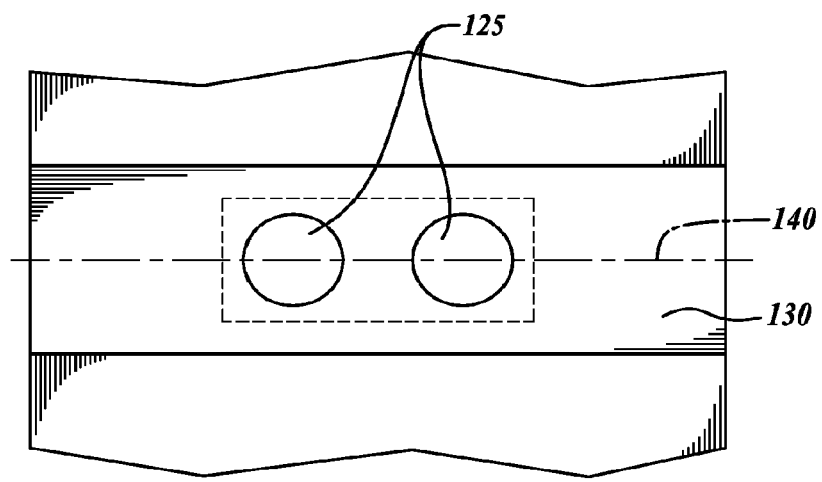
FIG. 4 is a top view of the exemplary embodiment in FIG. 3.
Figure 5:
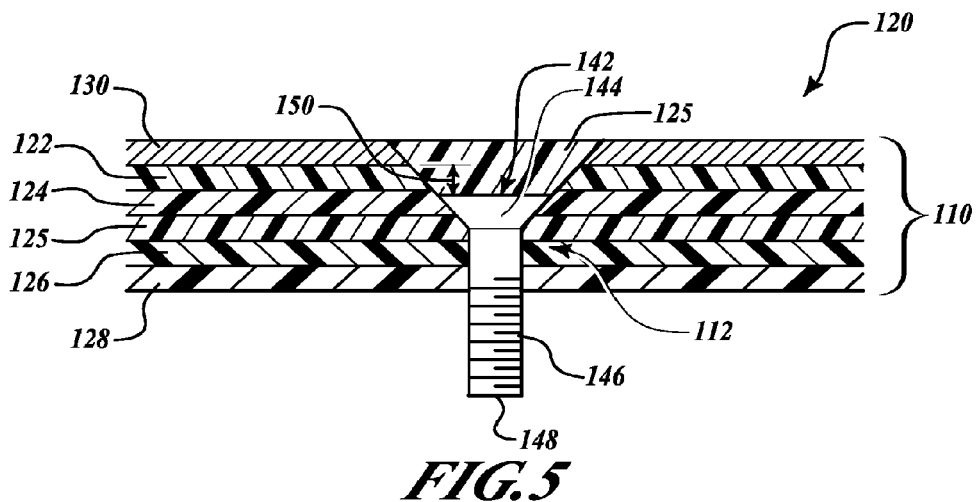
FIG. 5 is an enlarged cross sectional view of a portion of FIG. 3 showing a gap between fastener head and conductive strip.

As illustrated in FIGS. 3-5, a fuel tank portion 100 has a fuel tank skin 110 of a layered composite material 120. In the exemplary embodiment shown, the composite material has 5 layers 122, 124, 125, 126, 128 and has an outer conductive strip 130, as seen more clearly in FIG. 5. The conductive strip 130 extends along the fastener centerline 140. The fuel tank skin 110 has a through-hole 112 sized to receive a fastener 142 that has a fastener head 144, a shank 146 and a terminal end 148, as seen more clearly in FIG. 5. The through-hole 112 is counter sunk so that fastener head 144 lies below the outer conductive strip 130 by a gap 150 when the fastener 142 is tightened in place. In order to minimize any risk of electrical continuity or communication between the outer conductive strip 130 and the fastener head 144, the gap 150 may be in the range from about 1 mm to about 254 mm. As shown, the fastener 142 extends through the through-hole 112 and tank substructure 160 of the tank interior volume 155 to affix the tank skin 110 to the tank substructure 160 when appropriate torque is applied to nut 145. Once the fastener 142 is secured, a plug 125 of a dielectric or nonconductive material is applied to fill the gap 150 between the fastener head 144 and the outer conductive strip 130. The plug 125 is in intimate contact with fastener head 144. The dielectric material or non-conductive material may be for example: glass fiber in a matrix of a non-conductive phenolic or epoxy resin, and the like. The plug 125 of material filling the gap 150 creates an impedance greater than that between the conductive surface and the tank skin 110. This is intended to significantly lower substructure currents and lower the likelihood of sparking or arcing inside the tank volume 155.

Figure 6:
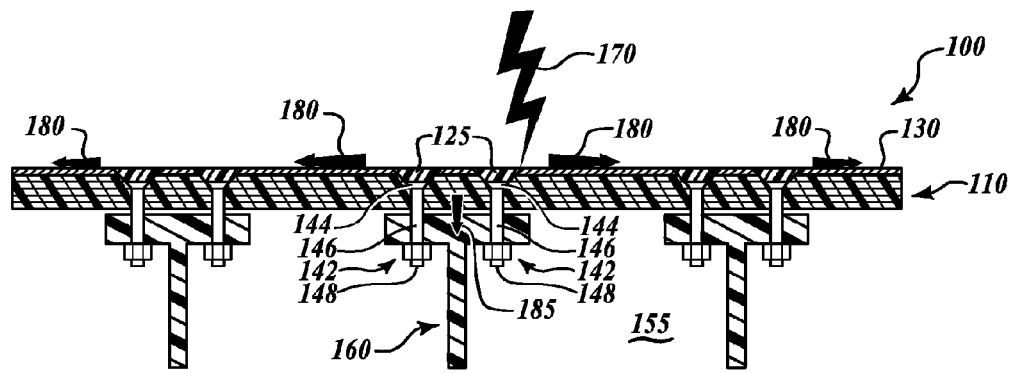
FIG. 6 is a schematic cross sectional view of a portion of a fuel tank in accordance with another exemplary embodiment, showing a lightning strike and directions of energy dissipation.
Figure 7:
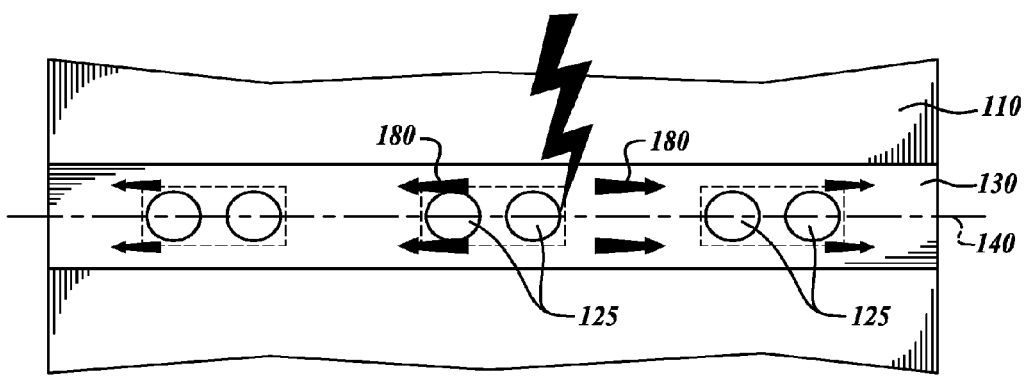
FIG. 7 is a top view of FIG. 6.

Referring to FIGS. 6 and 7, when lightning 170 strikes the plug 125 covering fastener head 144, the major portion of the lightning energy flows along the outer conductive strip 130, in the direction shown by arrows 180, to aircraft substructure (not shown) and thence to a grounding system (not shown). A portion of the energy may flow through the tank skin 110, as shown by arrow 185 to the fuel tank substructure 160. However, any such energy flow is too small to result in arcing into the fuel tank interior volume 155 or to cause hot particle ejection into tank interior volume 155. The fasteners 142 do not carry any significant amount of energy into the fuel tank interior. Accordingly, the fuel tank interior volume 155 is protected from the effects of lightning strikes.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A method of protecting a fuel tank from lightning strikes, the method comprising:
    enabling a shell of the fuel tank to be conductive with an electrically conductive layer disposed on an outer surface of the shell; and
    electrically isolating a plurality of fasteners that attach the fuel tank to an aircraft substructure at or near the conductive layer, from the conductive layer.

2. The method of claim 1, wherein electrically isolating a plurality of fasteners that attach the fuel tank to an aircraft substructure at or near the conductive layer, from the conductive layer, comprises:
    spacing each fastener of the plurality of fasteners from the conductive layer to form a gap between each fastener and the conductive layer.

3. The method of claim 2, further comprising:
    filling each gap with a nonconductive or dielectric material.

4. The method of claim 2, wherein spacing each fastener of the plurality of fasteners from the conductive layer to form a gap between each fastener and the conductive layer, comprises:
    positioning each fastener in a countersunk hole in the fuel tank to form the gap between each fastener and the conductive layer.

5. The method of claim 4, wherein each fastener comprises a fastener head, and wherein positioning each fastener in a countersunk hole in the fuel tank to form the gap between each fastener and the conductive layer, comprises:
    positioning each fastener in the countersunk hole in the fuel tank to form the gap between the fastener head of each fastener and the conductive layer.

6. The method of claim 4, wherein positioning each fastener in a countersunk hole in the fuel tank to form the gap between each fastener and the conductive layer, comprises:
    tightening each fastener in the countersunk hole to form the gap.

7. The method of claim 2, wherein the gap is from about 1.0 mm to about 254 mm.

8. The method of claim 3, wherein the nonconductive or dielectric material comprises glass fiber in a matrix of a non-conductive resin.

9. An apparatus for protecting a fuel tank from lightning strikes, comprising:
    an electrically conductive layer disposed on an outer surface of a shell of the fuel tank for enabling the shell to be conductive; and
    a plurality of fasteners that attach the fuel tank to an aircraft substructure at or near the conductive layer and that are electrically isolated from the conductive layer.

10. The apparatus of claim 9, further comprising:
    a gap between each fastener of the plurality of fasteners and the conductive layer to electrically isolate each fastener from the conductive layer.

11. The apparatus of claim 10, further comprising:
    a nonconductive or dielectric material filling each gap.

12. The apparatus of claim 10, further comprising:
    a plurality of countersunk holes in the fuel tank, each fastener being received in a countersunk hole of the plurality of countersunk holes, the gap between each fastener and the conductive layer comprising a gap in each countersunk hole.

13. The apparatus of claim 12, wherein each fastener comprises a fastener head, and wherein the gap between each fastener and the conductive layer comprises a gap between the fastener head of each fastener and the conductive layer.

14. The apparatus of claim 10, wherein the gap is from about 1.0 mm to about 254 mm.

15. The apparatus of claim 11, wherein the nonconductive or dielectric material comprises glass fiber in a matrix of a non-conductive resin.

16. The apparatus of claim 9, wherein the fuel tank comprises a composite material.

17. The apparatus of claim 9, wherein the conductive layer comprises one of a solid metal layer and a metal mesh layer.

18. A method of protecting a fuel tank from lightning strikes, the method comprising:
    enabling a shell of the fuel tank to be conductive with an electrically conductive layer disposed on an outer surface of the shell;
    spacing each fastener of a plurality of fasteners that attach the fuel tank to an aircraft substructure at or near the conductive layer, from the conductive layer, to form a gap between each fastener and the conductive layer; and
    filling each gap with a nonconductive or dielectric material to electrically isolate each fastener from the conductive layer.

19. The method of claim 18, wherein spacing each fastener of a plurality of fasteners that attach the fuel tank to an aircraft substructure at or near the conductive layer, from the conductive layer, to form a gap between each fastener and the conductive layer, comprises:
    positioning each fastener in a countersunk hole in the fuel tank to provide the gap between each fastener and the conductive layer.

20. The method of claim 19, wherein positioning each fastener in a countersunk hole in the fuel tank to provide the gap between each fastener and the conductive layer, comprises:
    tightening each fastener in the countersunk hole to form the gap.

* * * * *